United States Patent
Henry (10) Patent No.: US 10,820,468 B2
(45) Date of Patent: Nov. 3, 2020

(54) SYSTEM AND METHOD FOR DETERMINING SOIL ROUGHNESS OF A FIELD ACROSS WHICH AN AGRICULTURAL IMPLEMENT IS BEING MOVED BASED ON GROUND ENGAGING TOOL ACCELERATION

(71) Applicant: CNH Industrial Canada, Ltd., Saskatoon (CA)

(72) Inventor: James W. Henry, Saskatoon (CA)

(73) Assignee: CNH Industrial America LLC, Saskatoon, Saskatchewan (CA)

( * ) Notice: Subject to any disclaimer, the term of this patent is extended or adjusted under 35 U.S.C. 154(b) by 93 days.

(21) Appl. No.: 16/135,430

(22) Filed: Sep. 19, 2018

(65) Prior Publication Data
US 2020/0084952 A1    Mar. 19, 2020

(51) Int. Cl.
| | | |
|---|---|---|
| *A01B 63/14* | (2006.01) | |
| *A01B 5/04* | (2006.01) | |
| *A01B 76/00* | (2006.01) | |
| *A01B 79/00* | (2006.01) | |

(52) U.S. Cl.
CPC ............... *A01B 63/14* (2013.01); *A01B 5/04* (2013.01); *A01B 76/00* (2013.01); *A01B 79/005* (2013.01)

(58) Field of Classification Search
CPC ......... A01B 5/04; A01B 79/005; A01B 63/00; A01B 63/002; A01B 63/008; A01B 63/111; A01B 63/115; A01B 63/117; A01B 63/14
See application file for complete search history.

(56) References Cited

U.S. PATENT DOCUMENTS

| | | | |
|---|---|---|---|
| 5,487,006 A | * | 1/1996 | Kakizaki et al. .. B60G 17/0165 280/5.507 |
| 6,608,672 B1 | | 8/2003 | Shibusawa et al. |
| 8,448,587 B2 | | 5/2013 | Kowalchuk |

(Continued)

FOREIGN PATENT DOCUMENTS

| | | |
|---|---|---|
| WO | WO 2017/049186 | 3/2017 |
| WO | WO 2017/158006 | 9/2017 |

OTHER PUBLICATIONS

Thomsen et al., Soil Surface Roughness: Comparing Old and New Measuring Methods and Application in a Soil Erosion Model, Soil Journal Net, Soil Physics and Land Management Group, Wageningen University, Wageningen, the Netherlands Norwegian Institute for Agricultural and Environmental Research, Bioforsk, As, Norway, Published in SOIL, 1, 399-410, Apr. 24, 2015, 12 pages, https://www.soil-journal.net/1/399/2015/soil-1-399-2015.pdf.

(Continued)

*Primary Examiner* — Tara Mayo-Pinnock
(74) *Attorney, Agent, or Firm* — Rebecca L. Henkel; Rickard K. DeMille (57) ABSTRACT

In one aspect, a system for determining soil roughness of a field across which an agricultural implement is being moved may include a tool configured to perform a tillage operation on soil within the field as the agricultural implement is moved across the field. The system may also include a sensor configured to detect a parameter associated with an acceleration of the tool. Furthermore, the system may include a controller communicatively coupled to the sensor, with the controller configured to determine a soil roughness characteristic of the soil based on measurement signals received from the sensor.

6 Claims, 6 Drawing Sheets

(56) References Cited

U.S. PATENT DOCUMENTS

| | | | |
|---|---|---|---|
| 8,451,449 B2 | 5/2013 | Holland | |
| 8,573,319 B1 | 11/2013 | Casper et al. | |
| 8,688,331 B2 * | 4/2014 | Peterson et al. | A01M 7/0057 172/278 |
| 9,113,589 B2 | 8/2015 | Bassett | |
| 9,222,866 B2 | 12/2015 | Cline et al. | |
| 9,405,039 B2 | 8/2016 | Anderson | |
| 9,516,802 B2 | 12/2016 | Zemenchik | |
| 9,681,601 B2 | 6/2017 | Bassett | |
| 2006/0108127 A1 * | 5/2006 | Batthala et al. | A01B 63/1117 172/2 |
| 2006/0241837 A1 * | 10/2006 | Jarrett et al. | A01B 63/00 701/50 |
| 2007/0068129 A1 * | 3/2007 | Strosser | A01D 41/141 56/10.2 E |
| 2009/0164060 A1 * | 6/2009 | Fortson et al. | B60R 21/0132 701/33.4 |
| 2010/0319941 A1 * | 12/2010 | Peterson | A01B 79/005 172/1 |
| 2011/0184551 A1 * | 7/2011 | Kowalchuk | A01C 7/105 700/219 |
| 2014/0202126 A1 * | 7/2014 | Depestel et al. | A01D 75/187 56/10.2 J |
| 2014/0262370 A1 * | 9/2014 | Kohn et al. | A01B 49/027 172/140 |
| 2015/0305226 A1 | 10/2015 | Zemenchik | |
| 2018/0128933 A1 | 5/2018 | Koch et al. | |
| 2018/0139884 A1 | 5/2018 | Karstens et al. | |

OTHER PUBLICATIONS

Marinello et al., Application of the Kinect Sensor for Dynamic Soil Surface Characterization, Precision Agriculture, Dec. 2015, vol. 16, Issue 6, pp. 601-612, Published Online May 12, 2015, 18 pages total with Abstract.

Van Ouwerkerk et al., Electronic Microreliefmeter for Seedbed Characterization, Science Direct, Soil and Tillage Research, vol. 2, Issue 1, Mar. 1982, pp. 81-90, 13 pages total with Abstract.

* cited by examiner

SYSTEM AND METHOD FOR DETERMINING SOIL ROUGHNESS OF A FIELD ACROSS WHICH AN AGRICULTURAL IMPLEMENT IS BEING MOVED BASED ON GROUND ENGAGING TOOL ACCELERATION

FIELD OF THE INVENTION

The present disclosure generally relates to agricultural implements and, more particularly, to systems and methods for determining soil roughness of a field across which an agricultural implement is being moved based on the accelerations of one or more ground engaging tools of the implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools, such as harrow discs, shanks, leveling discs, rolling baskets, and/or the like, which loosen and/or otherwise agitate the soil to prepare the soil for subsequent planting operations.

Upon completion of the tillage operation, it is generally desirable that the soil within the field be relatively smooth. In this regard, it may be necessary to adjust one or more operating parameters of the tillage implement during the tillage operation when roughness of the tilled soil remains high. However, it may be difficult for the tillage implement operator to determine the soil roughness while performing the tillage operation.

Accordingly, an improved system and method for determining soil roughness of a field across which an agricultural implement is being moved would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining soil roughness of a field across which an agricultural implement is being moved. The system may include a tool configured to perform a tillage operation on soil within the field as the agricultural implement is moved across the field. The system may also include a sensor configured to detect a parameter associated with an acceleration of the tool. Furthermore, the system may include a controller communicatively coupled to the sensor, with the controller being configured to determine a soil roughness characteristic of the soil based on measurement signals received from the sensor.

In another aspect, the present subject matter is directed to a method for determining soil roughness of a field across which an agricultural implement is being moved. The agricultural implement may include a tool configured to perform a tillage operation on soil within the field as the agricultural implement is moved across the field. The method may include receiving, with a computing device, data indicative of a parameter associated with an acceleration of the tool. The method may also include determining, with the computing device, a soil roughness characteristic of the soil based on the received data. Furthermore, when the determined soil roughness characteristic exceeds a maximum soil roughness characteristic value, the method may include initiating, with the computing device, a control action.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining soil roughness of a field across which an agricultural implement is being moved. Specifically, in several embodiments, a controller of the disclosed system may be configured to receive measurement signals or other data from one or more sensors as the implement is being moved across a field. Each sensor may, in turn, be configured to detect a parameter indicative of the acceleration of a corresponding ground engaging tool of the implement that is configured to perform a tillage operation on the soil within the field, such as a disc gang and/or a basket assembly. In this regard, the controller may be configured to determine or estimate one or more soil roughness characteristics of the soil within the field, such as the surface roughness and/or seedbed floor roughness of the soil, based on the received measurement signals. Thereafter, in the event that the determined soil roughness characteristic(s) exceeds an associated maximum soil roughness threshold, the controller may be configured to initiate one or more control actions. Such control action(s) may generally be associated with reducing the soil roughness of the field. For example, in one embodiment, the control action(s) may include adjusting one or more operating parameters of the implement, such as the ground speed of the implement and/or the orientation of, the penetration depth of, or the down pressure being applied to the ground engaging tool(s).

Figure 1:
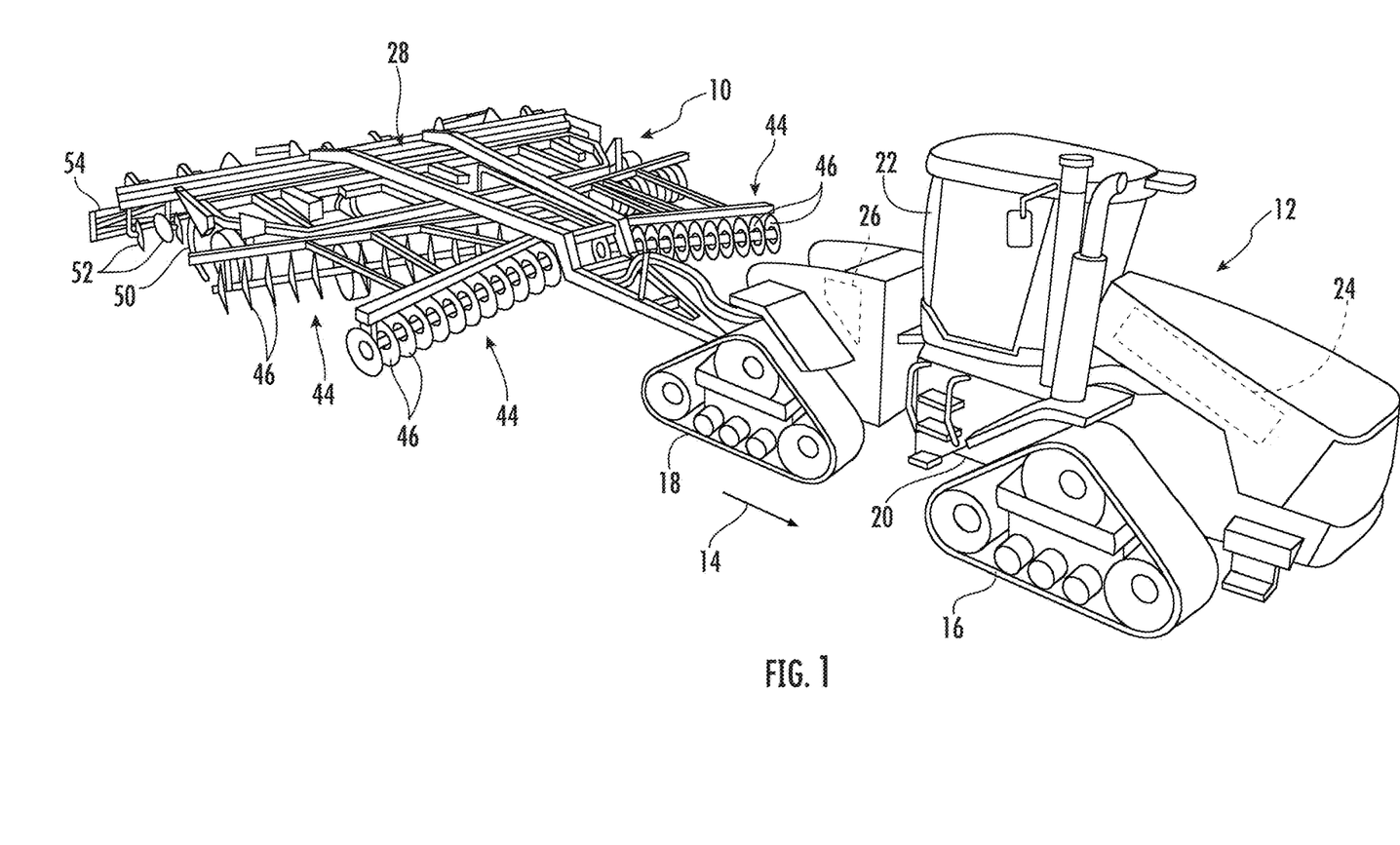
FIG. 1 illustrates a perspective view of one embodiment of an agricultural implement coupled to a work vehicle in accordance with aspects of the present subject matter.
Figure 2:
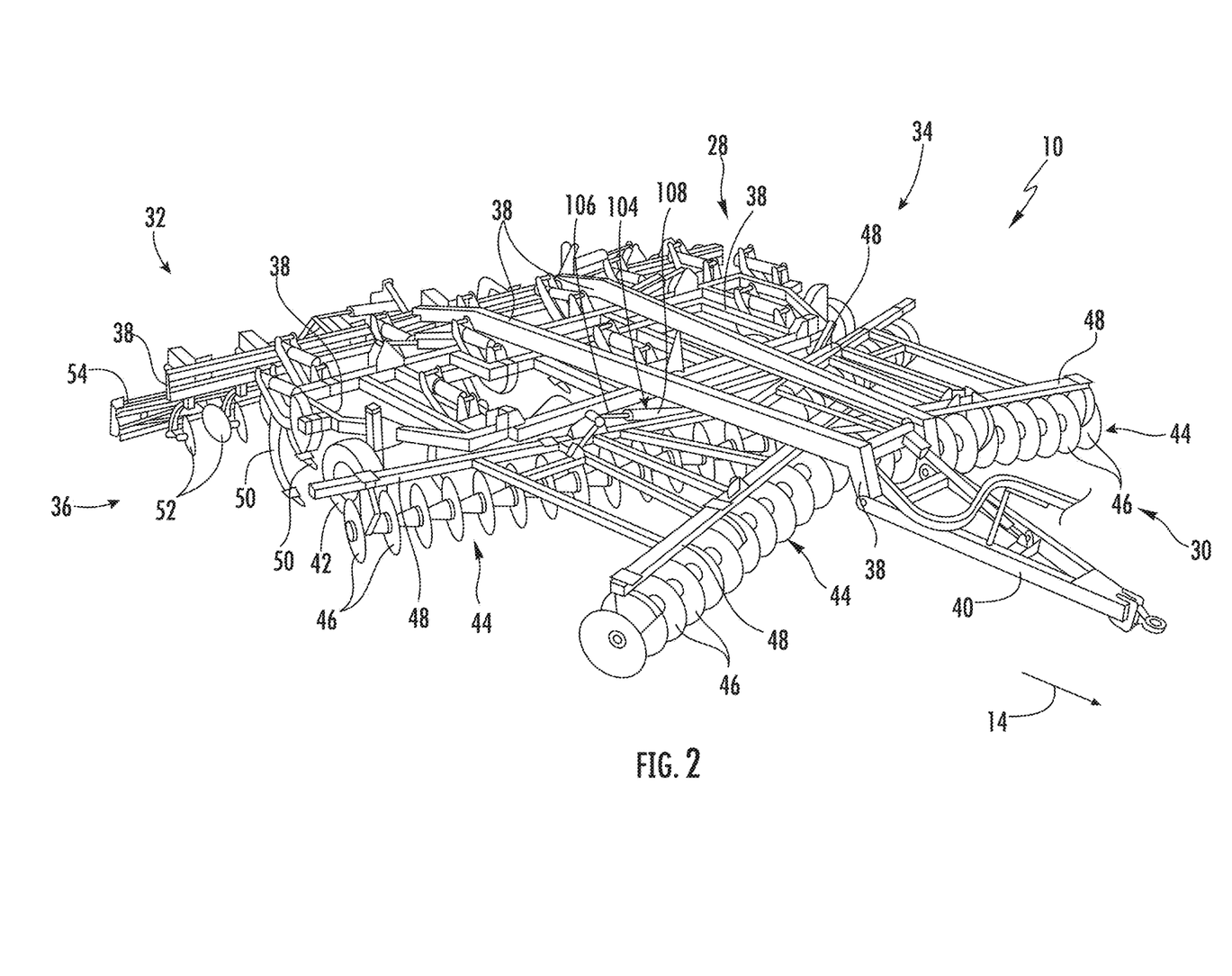
FIG. 2 illustrates an alternative perspective view of an agricultural implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically. FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102 shown in FIG. 5) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disc blades 46. Each disc blades 46 may, in turn, be configured to penetrate into or otherwise engage the soil as the implement 10 is being pulled through the field. In this regard, the various disc gangs 44 may be oriented at an angle relative to the direction of travel 14 to promote more effective tilling of the soil. In the embodiment shown in FIGS. 1 and 2, the implement 10 includes four disc gangs 44 supported on the frame 28 adjacent to its forward end 30. However, it should be appreciated that, in alternative embodiments, the implement 10 may include any other suitable number of disc gangs 44, such as more or fewer than four disc gangs 44. Furthermore, in one embodiment, the disc gangs 44 may be mounted to the frame 28 at any other suitable location, such as adjacent to its aft end 32.

Moreover, in several embodiments, the implement 10 may include a plurality of disc gang actuators 104 (one is shown), with each actuator 104 being configured to move or otherwise adjust the orientation or position of one of the disc gangs 44 relative to the implement frame 28. For example, as shown in the illustrated embodiment, a first end of each actuator 104 (e.g., a rod 106 of the actuator 104) may be coupled to a support arm 48 of the corresponding disc gang 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang 44 relative to a lateral centerline (not shown) of the frame 28 and/or the penetration depth of the associated disc blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support a plurality of leveling blades 52 and rolling (or crumbler) basket assemblies 54. However, in other embodiments, any other suitable ground-engaging tools may be coupled to and supported by the implement frame 28, such as a plurality closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
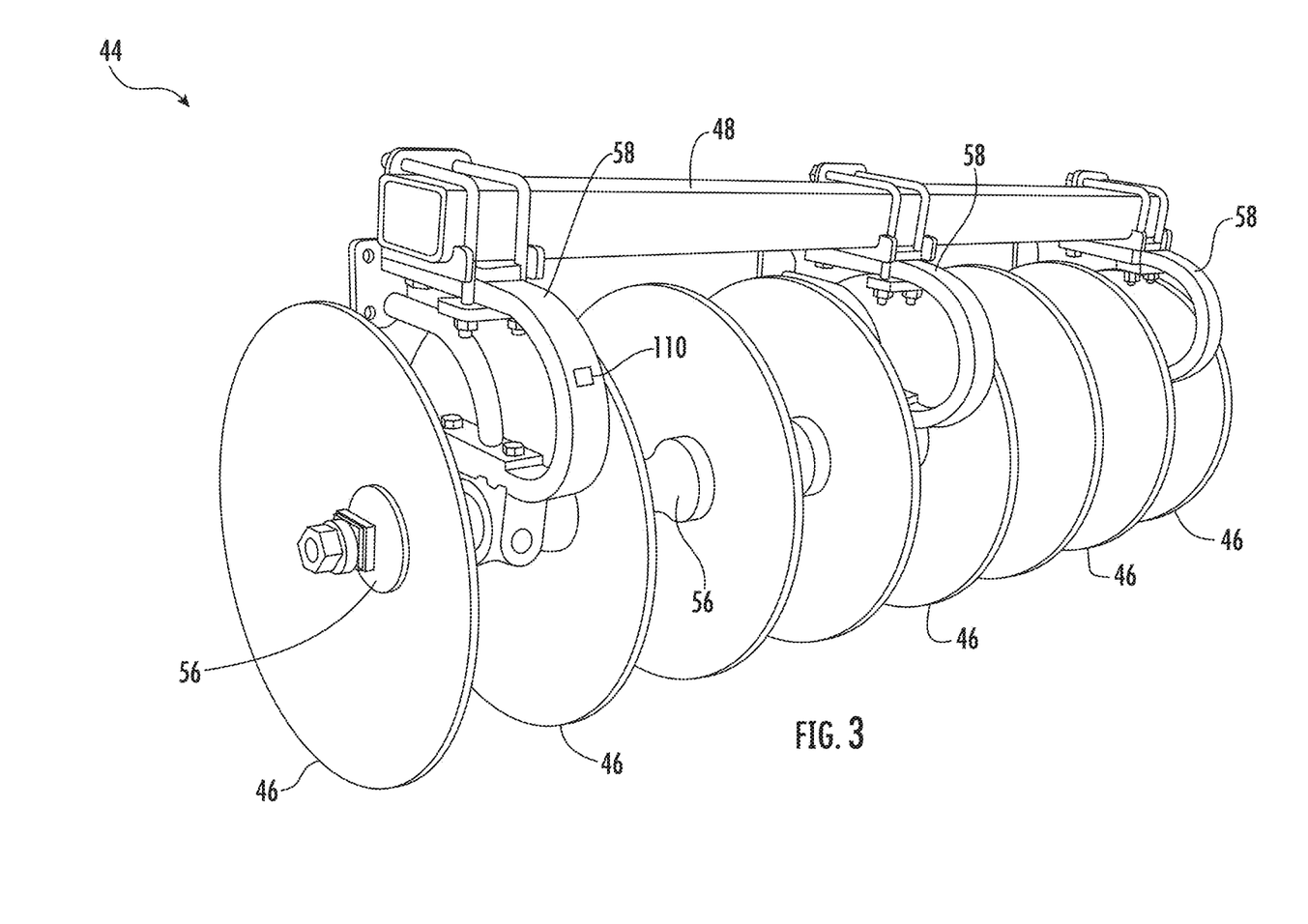
FIG. 3 illustrates a perspective view of one embodiment of a disc gang suitable for use with an agricultural implement in accordance with aspects of the present subject matter.

Referring now to FIG. 3, a perspective view of one embodiment of a disc gang 46 suitable for use on the implement 10 is illustrated in accordance with aspects of the present subject matter. More specifically, the disc blades 46 may be rotatably coupled to and spaced apart along the length of a disc gang shaft 56. The disc gang shaft 56 may, in turn, be positioned underneath and coupled to the support arm 48 of the disc gang 44 via one or more hangers 58. For example, in the illustrated embodiment, the hangers 58 define a C-shape that permits the disc gang shaft 56 and the disc blades 46 mounted thereon to move relative to the support arm 48. However, it should be appreciated that, in alternative embodiments, the hanger(s) 58 may have any other suitable configuration.

In accordance with aspects of the present subject matter, one or more acceleration sensors 110 may be provided in operative association with the disc gang 44. Specifically, in several embodiments, the acceleration sensor(s) 110 may be configured to detect a parameter indicative of the acceleration or the disc gang 44 relative to the field across which the implement 10 is being moved. For example, as shown, in one embodiment, the acceleration sensor(s) 110 may be installed on the hanger(s) 58. However, it should be appreciated that, in alternative embodiments, the acceleration sensor(s) 110 may be installed at any other suitable location on the disc gang 44. Furthermore, it should be appreciated that the acceleration sensor(s) 110 may be configured as any suitable type of acceleration sensing device(s), such as a piezoelectric accelerometer(s).

Additionally, it should be appreciated that the configuration of the disc gang 44 described above and shown in FIG. 3 is provided only to place the present subject matter in an exemplary field of use. Thus, it should be appreciated that the present subject matter may be readily adaptable to any manner of disc gang configuration.

Figure 4:
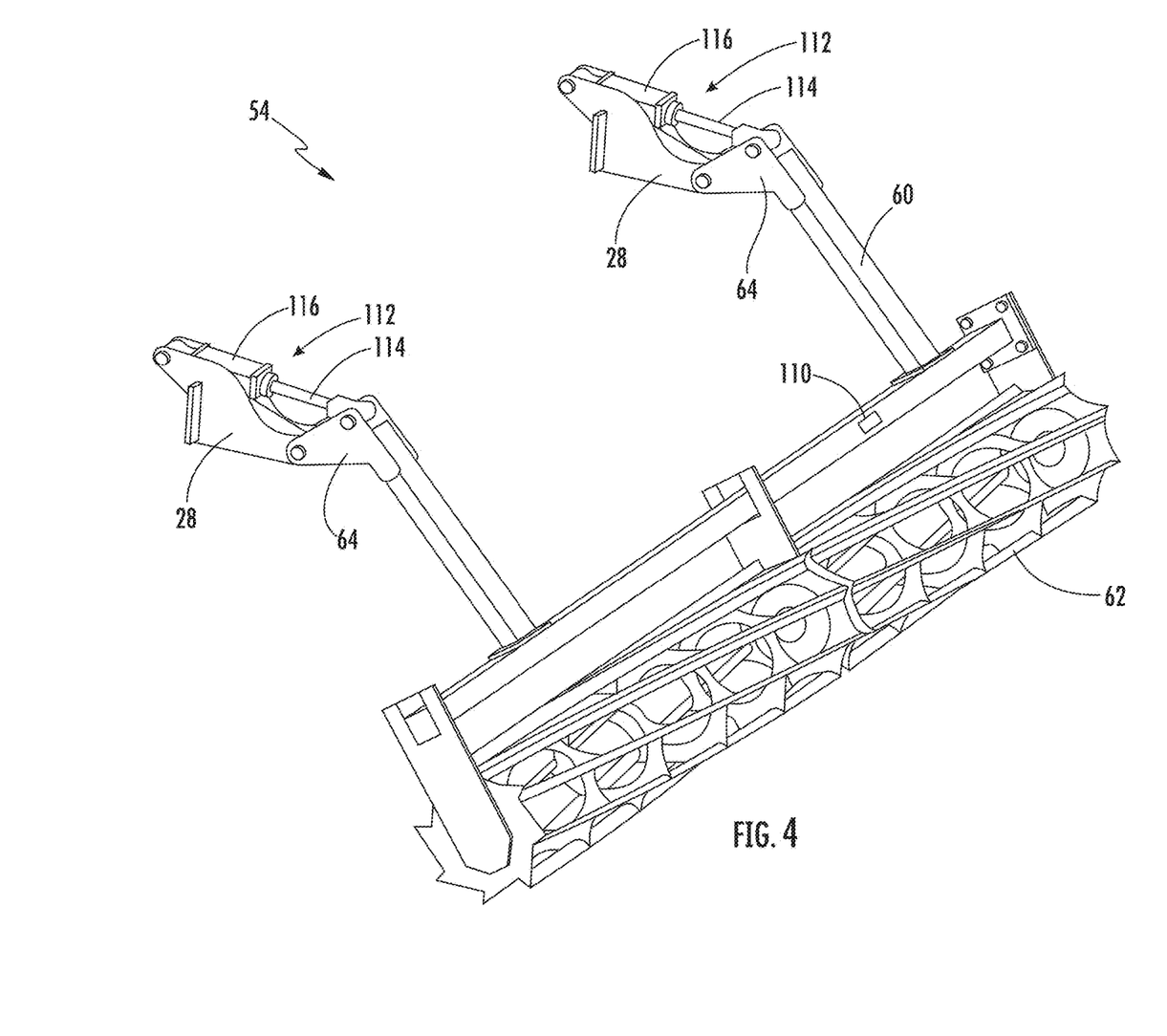
FIG. 4 illustrates a perspective view of one embodiment of a basket assembly suitable for use with an agricultural implement in accordance with aspects of the present subject matter.

Referring now to FIG. 4, a perspective view of one embodiment of a basket assembly 54 suitable for use on the implement 10 is illustrated in accordance with aspects of the present subject matter. Specifically, in several embodiments, the basket assembly 54 may include a basket assembly frame 60 that rotatably supports one or more rolling (or crumbler) baskets 62. The basket(s) 62 may, in turn, be configured to roll along the soil surface, thereby breaking up dirt clods or otherwise reducing the soil roughness of the field across which the implement 10 is being moved. Furthermore, the basket assemblies 54 may be pivotable or otherwise moveable relative to the implement frame 28 to permit one or more basket assembly actuators 112 to adjust the position of the basket assembly 54 relative to the frame 28. For example, as shown in the illustrated embodiment, a first end of each actuator 112 (e.g., a rod 114 of the actuator 112) may be coupled to a support bracket 64, which is, in turn, coupled to the basket assembly frame 60, while a second end of each actuator 112 (e.g., the cylinder 116 of the actuator 112) may be coupled to the implement frame 28. The rod 114 of each actuator 112 may be configured to extend and/or retract relative to the corresponding cylinder 116 to adjust the down pressure being applied to the basket(s) 62. In the illustrated embodiment, each actuator 112 corresponds to a fluid-driven actuator, such as a hydraulic or pneumatic cylinder. However, it should be appreciated that each actuator 112 may correspond to any other suitable type of actuator, such as an electric linear actuator.

In accordance with aspects of the present subject matter, one or more acceleration sensors 110 may be provided in operative association with the basket assembly 54. Specifically, in several embodiments, the acceleration sensor(s) 110 may be configured to detect a parameter indicative of the acceleration of the basket assembly 54 relative to the field across which the implement 10 is being moved. For example, as shown, in one embodiment, the acceleration sensor(s) 110 may be installed on the basket assembly frame 60. However, it should be appreciated that, in alternative embodiments, the acceleration sensor(s) 110 may be installed at any other suitable location on the basket assembly 54. Furthermore, it should be appreciated that acceleration sensor(s) 110 may be configured to detect a parameter (s) associated with the acceleration(s) of any other suitable ground engaging tool(s) of the implement 10 that are configured to perform a tillage operation on or otherwise work the soil within the field. Such tools may include ripper shanks, cultivator shanks, harrow tines, and/or the like.

Additionally, it should be appreciated that the configuration of the basket assembly 54 described above and shown in FIG. 4 is provided only to place the present subject matter in an exemplary field of use. Thus, it should be appreciated that the present subject matter may be readily adaptable to any manner of basket assembly configuration.

Figure 5:
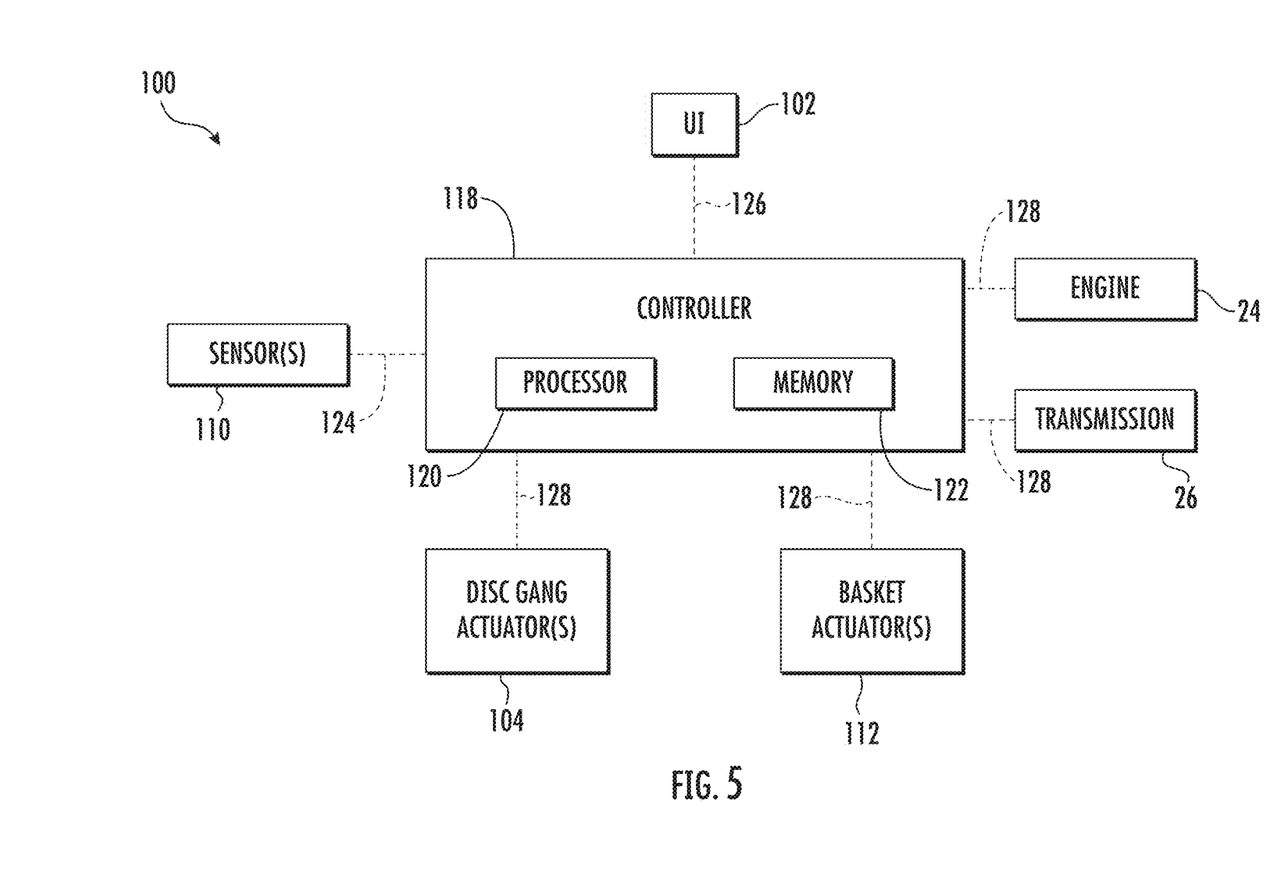
FIG. 5 illustrates a schematic view of one embodiment of a system for determining soil roughness of a field across which an agricultural implement is being moved in accordance with aspects of the present subject matter.

Referring now to FIG. 5, a schematic view of one embodiment of a system 100 for determining soil roughness of a field across which an agricultural implement is being moved is illustrated in accordance with aspects of the present subject matter. In general, the system 100 will be described herein with reference to the agricultural implement 10, the work vehicle 12, the disc gang 44, and the basket assembly 54 described above with reference to FIGS. 1-4. However, it should be appreciated by those of ordinary skill in the art that the disclosed system 10 (may generally be utilized with agricultural implements having any other suitable implement configuration, work vehicles having any other suitable vehicle configuration, disc gangs having any other suitable disc gang configuration, and/or basket assemblies having any other suitable basket assembly configuration.

As shown in FIG. 5, the system 100 may include a controller 118 configured to electronically control the operation of one or more components of the implement 10 and/or the work vehicle 12. In general, the controller 118 may comprise any suitable processor-based device known in the art, such as a computing device or any suitable combination of computing devices. Thus, in several embodiments, the controller 118 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 122 of the controller 118 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 122 may generally be configured to store suitable computer-readable instructions that, when implemented by the processor(s) 120, configure the controller 118 to perform various computer-implemented functions, such as one or more aspects of the method 200 described below with reference to FIG. 6. In addition, the controller 118 may also include various other suitable components, such as a communications circuit or module, one or more input/output channels, a data/control bus and/or the like.

It should be appreciated that the controller 118 may correspond to an existing controller of the implement 10 or the work vehicle 12 or the controller 118 may correspond to a separate processing device. For instance, in one embodiment, the controller 118 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

Furthermore, in one embodiment, the system 100 may also include the user interface 102. More specifically, the user interface 102 may be configured to provide feedback (e.g., notifications associated with the soil roughness of the field across which the implement 10 is being moved) to the operator of the implement 10. As such, the user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the cab 22 of the work vehicle 12. However, in alternative embodiments, the user interface 102 may have any suitable configuration and/or be positioned in any other suitable location.

In several embodiments, the controller 118 may be configured to determine one or more soil roughness characteristics of the soil within the field across which the implement 10 is being moved. Specifically, as shown in FIG. 5, the controller 118 may be communicatively coupled to the acceleration sensor(s) 110 via wired or wireless connection to allow measurement signals (e.g., as indicated by dashed lines 124 in FIG. 5) to be transmitted from the acceleration sensor(s) 110 to the controller 118. In this regard, the controller 118 may be configured to determine or estimate the soil roughness characteristic(s) of the soil within the field, such as the surface roughness of the soil or the seedbed floor roughness of the soil, based on the received measurement signals 124. For instance, the controller 118 may include a look-up table, suitable mathematical formula, and/or algorithms stored within its memory 122 that correlates the received measurement signals 124 to the soil roughness characteristic(s).

Furthermore, the controller 118 may be configured to monitor the determined soil roughness characteristic(s) and initiate one or more control actions when the soil roughness characteristic(s) exceeds a maximum soil roughness characteristic value(s). Specifically, in several embodiments, the controller 118 may be configured to compare the values associated with the monitored soil roughness characteristic(s) to an associated maximum soil roughness characteristic value. Thereafter, in the event that the value(s) of the monitored soil roughness characteristic(s) exceeds the associated maximum soil roughness characteristic value (thereby indicating that the soil roughness of the soil within the field may be too high), the controller 118 may be configured to initiate one or more control actions.

In one embodiment, the controller 118 may be configured to notify the operator of implement 10 that the value(s) of the monitored soil roughness characteristic(s) has exceeded the associated maximum soil roughness characteristic value. Specifically, in one embodiment, the controller 118 may be communicatively coupled to the user interface 102 via a wired or wireless connection to allow feedback signals (e.g., indicated by dashed line 126 in FIG. 5) to be transmitted from the controller 118 to the user interface 102. In such embodiment, the feedback signals 126 may instruct the user interface 102 to provide a notification to the operator of the implement 10 (e.g., by causing a visual or audible notification or indicator to be presented to the operator) that provides an indication that the value(s) of the monitored soil roughness characteristic(s) has exceeded the associated maximum soil roughness characteristic value. In such instances, the operator may then choose to initiate any suitable corrective action he/she believes is necessary, such as adjusting one or more operating parameters of the implement 10 and/or the work vehicle 12.

Moreover, in several embodiments, the controller 118 may be configured to automatically adjust one or more operating parameters of the implement 10 when it is determined that the value(s) of the monitored soil roughness characteristic(s) has exceeded the associated maximum soil roughness characteristic value. Specifically, as shown in FIG. 5, the controller 118 may be communicatively coupled to the disc gang actuator(s) 104 and/or the basket assembly actuator(s) 112 of the implement 10 via a wired or wireless connection to allow control signals (e.g., as indicated by dashed lines 128 in FIG. 5) to be transmitted from the controller 118 to the actuator(s) 104 and/or the actuators 112. As such, the controller 118 may be configured to transmit control signals 128 to the actuator(s) 104 instructing the actuator(s) 104 to adjust the angle of the disc gang(s) 44 relative to the lateral centerline of the implement frame 28 and/or the penetration depth of the associated disc blade(s) 46. In addition, the controller 118 may be configured to transmit control signals 128 to the actuator(s) 112 instructing the actuator(s) 112 to adjust the down pressure being applied to the basket(s) 62.

Furthermore, in one embodiment, the controller 118 may be configured to automatically adjust the ground speed at which the work vehicle 12 is towing the implement 10 across the field when it is determined that the value(s) of the monitored soil roughness characteristic(s) has exceeded the associated maximum soil roughness characteristic value. Specifically, the controller 118 may be communicatively coupled to the engine 24 and/or the transmission 26 of the work vehicle 12 via a wired or wireless connection to allow control signals 128 to be transmitted from the controller 118 to the engine 24 and/or the transmission 26. For example, the control signals 128 may be configured to instruct the engine 24 to vary its power output to increase or decrease the ground speed of the work vehicle 12 in a manner that reduces the soil roughness of the field. Similarly, the control signals 128 may be configured to instruct the transmission 26 to upshift or downshift to change the ground speed of the work vehicle 12 in a manner that reduces the soil roughness of the field. However, it should be appreciated that, in alternative embodiments, the controller 118 may be configured to transmit control signals to any other suitable component of the work vehicle 12 and/or implement 10 such that the ground speed of the work vehicle 12 and/or implement 10 is adjusted.

As indicated above, in one embodiment, the acceleration sensor(s) 110 may be configured to detect a parameter indicative of the acceleration of one or more of the disc gangs 44. In such embodiment, the controller 118 may be configured to determine or estimate the seedbed floor roughness of the soil within the field across which the implement 10 is being moved based on the received measurement signals 124. For instance, the controller 118 may include a look-up table, suitable mathematical formula, and/or algorithms stored within its memory 122 that correlates the received measurement signals 124 to the seedbed floor roughness of the soil. Thereafter, in the event that the value(s) of the determined seedbed floor roughness exceeds a maximum seedbed floor roughness value (thereby indicating that the seedbed floor roughness may be too high), the controller 118 may be configured to initiate one or more control actions. For example, in such instances, the controller 118 may be configured to transmit control signals 128 to the disc gang actuator(s) 104 instructing the actuator(s) 104 to adjust the angle of the disc gang(s) 44 relative to the lateral centerline of the implement frame 28 and/or the penetration depth of the disc blade(s) 46 in a manner that reduces the seedbed floor roughness of the soil.

Additionally, as indicated above, in another embodiment, the acceleration sensor(s) 110 may be configured to detect a parameter indicative of the acceleration of one or more of the basket assemblies 54. In such embodiment, the controller 118 may be configured to determine or estimate the surface roughness of the soil within the field across which the implement 10 is being moved based on the received measurement signals 124. For instance, the controller 118 may include a look-up table, suitable mathematical formula, and/or algorithms stored within its memory 122 that correlates the received measurement signals 124 to the surface roughness of the soil. Thereafter, in the event that the value(s) of the determined surface roughness exceeds a maximum surface roughness value (thereby indicating that the surface roughness may be too high), the controller 118 may be configured to initiate one or more control actions. For example, in such instances, the controller 118 may be configured to transmit control signals 128 to the basket assembly actuator(s) 112 instructing the actuator(s) 112 to increase the down pressure being applied to the associated basket(s) 62, which may, in turn, reduce the surface roughness of the soil.

Figure 6:
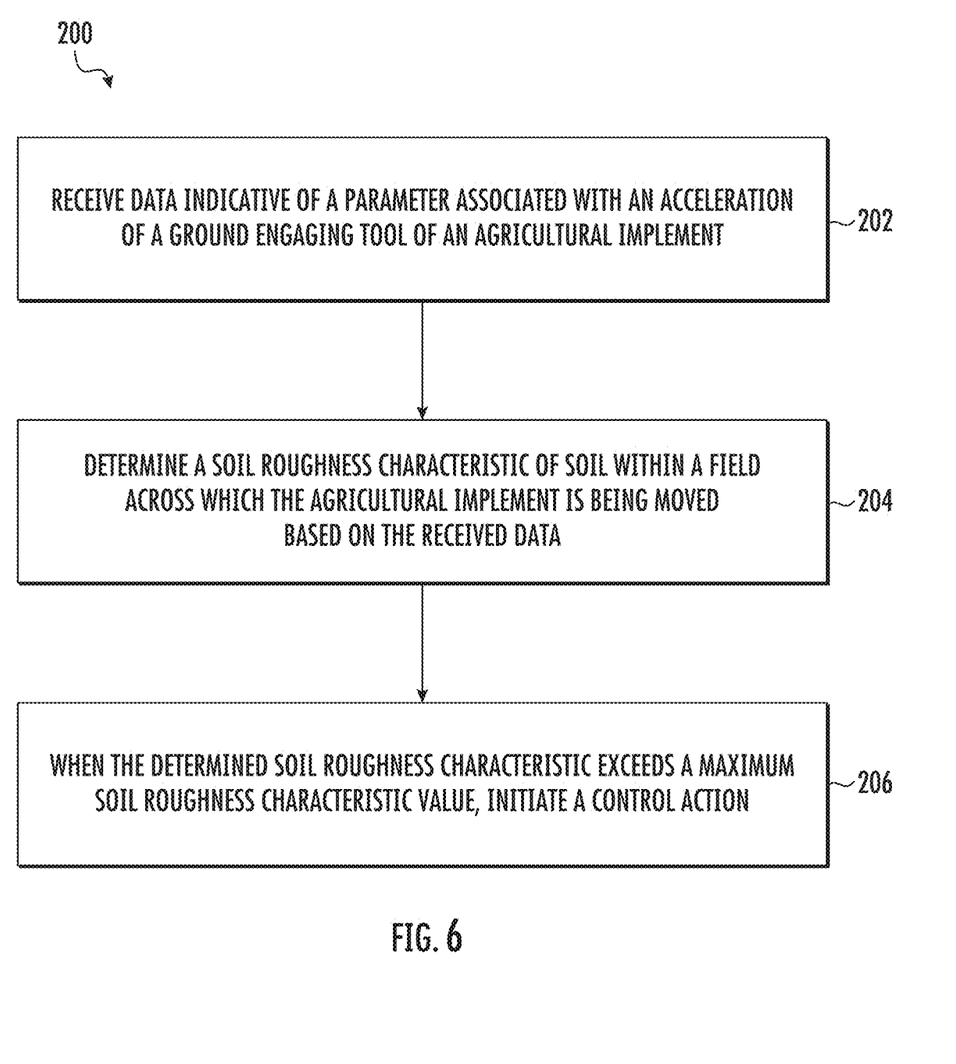
FIG. 6 illustrates a flow diagram of one embodiment of a method for determining soil roughness of a field across which an agricultural implement is being moved in accordance with aspects of the present subject matter.

Referring now to FIG. 6, a flow diagram of one embodiment of a method 200 for determining soil roughness of a field across which an agricultural implement is being moved is illustrated in accordance with aspects of the present subject matter. In general, the method 200 will be described herein with reference to the implement 10 and the system 100 described above with reference to FIGS. 1-5. However, it should be appreciated by those of ordinary skill in the art that the disclosed method 200 may generally be utilized to determine soil roughness of the field in connection with any agricultural implement having any suitable implement configuration and/or any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving, with a computing device, data indicative of a parameter associated with an acceleration of a ground engaging tool of an agricultural implement. For instance, as described above, the controller 118 may be communicatively coupled to one or more acceleration sensors 110 provided in operative association with one or more ground engaging tools of the implement 10, such the disc gang(s) 44 and/or the basket assembly(ies) 54. As such, when the implement 10 is being towed across the field by the work vehicle 12, the controller 118 may be configured to receive measurement signals 124 from the acceleration sensor(s) 110.

Additionally, at (204), the method 200 may include determining, with the computing device, a soil roughness characteristic of soil within a field across which the agricultural implement is being moved based on the received data. For instance, as described above, the controller 118 may be configured to determine or estimate one or more soil roughness characteristics of the soil within the field across which the implement 10 is being moved, such as the surface roughness of the soil or the seedbed floor roughness of the soil, based on the received measurement signals 124.

Moreover, as shown in FIG. 6, at (206), the method 200 may include, when the determined soil roughness characteristic exceeds a maximum soil roughness characteristic value, initiating, with the computing device, a control action. For instance, as described above, the controller 118 may be communicatively coupled to the disc gang actuator(s) 104 of the implement 10, the basket assembly actuator(s) 112 of the implement 10, the engine 24 of the work vehicle 12, and/or the transmission 26 of the work vehicle 12. As such, when the determined soil roughness characteristic(s) exceeds a maximum soil roughness characteristic value(s), the controller 118 may be configured to transmit control signals 128 to the actuator(s) 104, the actuator(s) 112, the engine 24, and/or the transmission 26 instructing such devices to adjust one or more operating parameters of the implement 10. For example, such operating parameters may include the angle of the disc gang(s) 44 relative to the lateral centerline of the implement frame 28, the penetration depth of the disc blade(s) 46, the down pressure being applied to basket(s) 62, and/or the ground speed of the implement 10.

It is to be understood that the steps of the method 200 are performed by the controller 118 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 118 described herein, such as the method 200, is implemented in software code or instructions which are tangibly stored on a tangible computer readable medium. The controller 118 loads the software code or instructions via a direct interface with the computer readable medium or via a wired and/or wireless network. Upon loading and executing such software code or instructions by the controller 118, the controller 118 may perform any of the functionality of the controller 118 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining seedbed floor roughness of a field across which an agricultural implement is being moved, the system comprising:
    a tool configured to perform a tillage operation on soil within the field as the agricultural implement is moved across the field, wherein the tool comprises a disc gang including a plurality of discs configured to penetrate below a surface of the soil;
    a sensor installed on a hanger of the disc gang and configured to detect a parameter associated with an acceleration of the tool; and
    a controller communicatively coupled to the sensor, the controller being configured to determine a seedbed floor roughness characteristic of the soil based on measurement signals received from the sensor,
    wherein the determined seedbed floor roughness characteristic is indicative of a roughness of a seedbed floor located below the surface of the soil within the field.

2. The system of claim 1, wherein the controller is further configured to monitor the seedbed floor roughness characteristic relative to a maximum seedbed floor roughness characteristic value and initiate a control action when the monitored seedbed floor roughness characteristic has exceeded the maximum seedbed floor roughness characteristic value.

3. The system of claim 2, wherein the control action comprises notifying an operator of the agricultural implement that the monitored seedbed floor roughness characteristic has exceeded the maximum seedbed floor roughness characteristic value.

4. The system of claim 2, wherein the control action comprises adjusting an operating parameter of the agricultural implement.

5. The system of claim 4, wherein the operating parameter comprises a ground speed of the agricultural implement.

6. The system of claim 1, wherein the controller is further configured to control an operation of an actuator in a manner that adjusts at least one of an angle or a penetration depth of the disc gang when the monitored seedbed floor roughness characteristic has exceeded a maximum seedbed floor roughness value.

* * * * *